(12) United States Patent
Malvar

(10) Patent No.: US 7,480,417 B2
(45) Date of Patent: Jan. 20, 2009

(54) SYSTEM AND METHOD FOR ENCODING MOSAICED IMAGE DATA EMPLOYING A REVERSIBLE COLOR TRANSFORM

(75) Inventor: Henrique Malvar, Sammamish, WA (US)

(73) Assignee: Microsoft Corp., Redmond, WA (US)

( * ) Notice: Subject to any disclaimer, the term of this patent is extended or adjusted under 35 U.S.C. 154(b) by 961 days.

(21) Appl. No.: 10/968,236

(22) Filed: Oct. 19, 2004

(65) Prior Publication Data
US 2006/0083432 A1 Apr. 20, 2006

(51) Int. Cl.
G06K 9/36 (2006.01)
G06K 9/00 (2006.01)
G06K 9/46 (2006.01)

(52) U.S. Cl. ...... 382/244; 382/166

(58) Field of Classification Search ........ 382/162, 382/164, 166, 173, 232, 233, 240, 244, 248, 382/276, 277, 284, 305; 345/589, 600–604; 375/240.11; 708/402, 405, 409
See application file for complete search history.

(56) References Cited

U.S. PATENT DOCUMENTS

| | | | |
|---|---|---|---|
| 3,971,065 A | 7/1976 | Bayer | |
| 4,724,395 A | 2/1988 | Freeman | |
| 5,260,808 A * | 11/1993 | Fujii | 382/166 |
| 5,373,322 A | 12/1994 | Laroche et al. | |
| 5,506,619 A | 4/1996 | Adams, Jr. et al. | |
| 5,686,960 A * | 11/1997 | Sussman et al. | 348/218.1 |
| 5,805,217 A | 9/1998 | Lu et al. | |
| 6,134,347 A * | 10/2000 | Niwamoto | 382/166 |
| 6,487,312 B2 * | 11/2002 | Kostrzewski et al. | 382/232 |
| 6,654,492 B1 | 11/2003 | Sasai | |
| 6,771,828 B1 | 8/2004 | Malvar | 375/240.11 |
| 6,809,765 B1 * | 10/2004 | Tao | 348/273 |
| 6,847,396 B1 | 1/2005 | Lin | |
| 6,990,235 B2 * | 1/2006 | Katsuyama | 382/173 |
| 7,035,457 B2 * | 4/2006 | Ishibashi | 382/166 |
| 7,046,853 B2 * | 5/2006 | Okada | 382/233 |
| 7,155,066 B2 * | 12/2006 | Baharav et al. | 382/248 |
| 7,236,191 B2 | 6/2007 | Kalevo et al. | |
| 2002/0015447 A1 | 2/2002 | Zhou | |
| 2002/0167602 A1 | 11/2002 | Nguyen | |
| 2006/0083432 A1 * | 4/2006 | Malvar | 382/232 |

OTHER PUBLICATIONS

T. Toi and M. Ohita, "A subband coding technique for image compression in single CCD cameras with Bayer color filter arrays," *IEEE Trans. Consumer Electronics*, vol. 45, pp. 176-180, Feb. 1999.

(Continued)

*Primary Examiner*—Amir Alavi
(74) *Attorney, Agent, or Firm*—Lyon & Harr, LLP; Katrina A. Lyon

(57) ABSTRACT

A new color space that maps image pixel values in a mosaiced sampling pattern (such as that generated by a Bayer color filter array) into four color channels that correspond to rectangular sampling patterns. Because these new channels correspond to a rectangular sampling grid, they are much more amenable to processing steps such as compression. In one embodiment, the transformation from the original mosaic-patterned pixels into the new four-channel color space can be made reversible in integer arithmetic. That allows for the implementation of efficient lossless image compression systems for mosaiced (e.g., raw, or raw Charged Couple Device (CCD)) images.

36 Claims, 10 Drawing Sheets
(2 of 10 Drawing Sheet(s) Filed in Color)

OTHER PUBLICATIONS

C. C. Koh, J. Mukherjee, and S. K. Mitra, "New efficient methods of image compression in digital cameras with color filter array," *IEEE Trans. Consumer Electronics*, vol. 49, pp. 1448-1456, Nov. 2003.

P. Lux, "A novel set of closed orthogonal functions for picture coding," *Arch. Elek. Übertragung*, vol. 31, pp. 267-274, 1977.

H. S. Malvar and G. Sullivan, "YCoCg-R: a color space with RGB reversibility and low dynamic range," Joint Video Team (JVT) of ISO/IEC MPEG & ITU-T VCEG, Doc. No. JVT-I014, Trondheim, Norway, Jul. 2003.

Chang, E., S. Cheung, and D. Y. Pan, Color filter array recovery using a threshold-based variable number of gradients, Proceedings of SPIE, Sensors, Cameras, and Applications for Digital Photography, Nitin Sampat, Thomas Yeh, Editors, Mar. 1999, pp. 36-43, vol. 3650.

Gunturk, B. K., Y. Altunbasak, R. M. Mersereau, Color plane interpolation using alternating projections, IEEE Transactions on Image Processing, Sep. 2002, pp. 997-1013, vol. 11, No. 9.

Kimmel, R., Demosaicing: Image reconstruction from color CCD samples, IEEE Trans. Image Processing, Sep. 1999, pp. 1221-1228, vol. 8.

Longére, P., X. Zhang, P. B. Delahunt, D. H. Brainard, Perceptual assessment of demosaicing algorithm performance, Proceedings of the IEEE, Jan. 2002, pp. 123-132, vol. 90, No. 1.

Malvar, H. S., L.-W. He, and R. Cutler, High-quality linear interpolation for demosaicing of Bayer-patterned color images, IEEE Int'L Conf. on Acoustics, Speech, and Signal Processing, Montreal, Canada, May 2004.

Pei, S.-C., L.-K. Tam, Effective color interpolation in CCD color filter array usingsignal correlation, Int'l Conf. on Image Processing, 2000, pp. 488-491, vol. 3.

Ramanath, R., W. E. Snyder, G. L. Bilbro, and W. A. Sander, Demosaicking methods for the Bayer color array, J. Elec. Imag., 2002, pp. 306-315, vol. 11, No. 3.

Wu, X., N. Zhang, Primary-consistent soft-decision color demosaicing for digital cameras, IEEE Transactions on Image Processing, vol. 13, No. 9, Sep. 2004, pp. 1263-1274.

Colin Larose, U.S. Appl. No. 10/801,450, Office Action, Mar. 26, 2008.

* cited by examiner

Direct mapping:

Inverse mapping:

SYSTEM AND METHOD FOR ENCODING MOSAICED IMAGE DATA EMPLOYING A REVERSIBLE COLOR TRANSFORM

BACKGROUND

1. Technical Field

This invention is directed toward a system and method for encoding and decoding color image data. More particularly, this invention is directed toward a system and method for compressing image data formatted in a mosaiced sampling pattern by employing a reversible color transform.

2. Background Art

Typical digital cameras use a single light sensitive sensor and a color filter array. Each pixel element in the color filter array records the intensity information of a single color component, typically red, green or blue. In most applications, the captured data is interpolated into a full color image, which is then compressed. A Bayer-patterned color filter array is often used as the preferred color filter array. In this type of filter, green filters are interlaced with red and blue filters.

It has been noted, however, that when color interpolation is performed before compression, instead of after compression, better image quality and higher compression ratios can be achieved. Typically the goal in image compression is to increase the compression ratio of the compressed data while maintaining high image quality.

There are various problems with known image compression systems, however, even those that interpolate before compressing the data. For instance, direct compression of color filter array data with Joint Photographic Experts Group (JPEG) compression produces poor quality images. If, however, the Bayer patterned color filter array data is separated into the three primary components (red, green, blue), the red and blue components can be down-sampled into a compact rectangular array and compressed directly. To do this it is necessary to find a transformation of the quincunx green pixels typical of the Bayer format into a form suitable for compression. Lee and Ortega [3] use a reversible transformation that maps pixel information from the Bayer pattern color filter array into another range. The mapping rotates the original interlaced array into a rhombus, packing the data together. However, the shape of the data to be compressed after transformation is not rectangular and thus is not suitable for typical JPEG compression. Toi and Ohita [2] apply sub-band decomposition to compress the color filter array data using a non-separable two-dimensional diamond filter to process the quincunx green array. The sub-bands are then encoded for optimum rate-distortion. Reconstruction of the image data is carried out by decoding, synthesizing and interpolating the data to obtain the resultant full color image. This method is also somewhat computationally expensive and since it does not allow for exact invertibility in integer arithmetic it is not suitable for lossless compression. Koh, Mukherjee and Mitra [4] also devised a method of compressing color filter array data before full color interpolation. In this system, image content affected the performance of the compression and interpolation algorithms and sometimes adversely affected the image quality.

In general, there are two types of compression—lossy and lossless. Lossless compression allows exact original data to be recovered after compression and decompression, while lossy compression allows for the data to be recovered after compression and decompression to vary slightly from the original data. There is a tradeoff between these two types of compression in that lossy compression typically provides for a better compression ratio than lossless compression, while lossless compression provides a better image quality after decompression.

It is noted that in the remainder of this specification, the description refers to various individual publications identified by a numeric designator contained within a pair of brackets. For example, such a reference may be identified by reciting, "reference [1]" or simply "[1]". A listing of the publications corresponding to each designator can be found at the end of the Detailed Description section.

SUMMARY

The system and method of the present invention overcomes the aforementioned limitations of previous image compression schemes by mapping mosaic-patterned pixels, typical of the Bayer data format, to four color channels that correspond to a regular pattern. In some embodiments of the invention, direct and inverse transform matrices that have integer magnitudes are employed. This provides reduced computational complexity, and lossless compression may be readily achieved. A lossless compression system for raw Charged Couple Device (CCD) data from a digital camera may then be constructed using these reversible color transforms and lossless codecs for each color channel.

The invention comprises a new color space that maps image pixel values in a mosaiced sampling pattern (such as that generated by a Bayer color filter array [1]) into four color channels that correspond to rectangular sampling patterns. Because these new channels correspond to a rectangular sampling grid, they are much more amenable to processing steps such as compression.

An additional aspect of the invention is that the transformation from the original mosaic-patterned pixels into the new four-channel color space can be made reversible in integer arithmetic. That allows for the implementation of efficient lossless image compression systems for mosaiced (e.g., raw, or raw CCD) images. In one working embodiment of the system and method of the invention this transform was used in a Progressive Transform Codec (PTC) [7], with better compression results and lower computational complexity than systems based on pixel value prediction (such as PNG—"portable network graphics"). However, the transform may be applied with any conventional codec.

When lossless compression is not necessary, one embodiment of the invention also provides for a lossy result; in that case the four-channel transform of the invention can be used in either an integer-reversible or a reduced-complexity form, coupled with any lossy image codec.

The system and method of the invention allows for the efficient compression of raw CCD camera data with a relatively low computational complexity, thus making it attractive to camera manufacturers. The system and method of the invention also provides for higher image quality and provides for lower bandwidth requirements to transfer the data to other sites and less storage requirements to save the image data to a storage medium.

The system and method of the invention also allows for codecs that support both lossless and lossy compression (such as PTC) to be used in a mosaiced-sensor digital camera to support both high compression (lossy) and maximum-fidelity raw (lossless) formats. That is an advantage over current digital cameras that support raw mode, in which different codecs are employed for lossy and lossless compression, increasing firmware size or chip gate count.

In addition to the just described benefits, other advantages of the present invention will become apparent from the detailed description which follows hereinafter when taken in conjunction with the drawing figures which accompany it.

DESCRIPTION OF THE DRAWINGS

The file of this patent contains at least one drawing executed in color. Copies of this patent with color drawing(s) will be provided by the U.S. patent and Trademark Office upon request and payment of the necessary fee.

The specific features, aspects, and advantages of the invention will become better understood with regard to the following description, appended claims, and accompanying drawings where:

FIG. 5A depicts an encoder, while FIG. 5B depicts the corresponding decoder. One lossless image codec that can be used is a PTC codec [7]. However, the reversible transform of the system and method of the invention can be used with any lossless compression system.

FIG. 8A depicts an encoder, while FIG. 8B depicts a corresponding decoder.

DETAILED DESCRIPTION OF THE PREFERRED EMBODIMENTS

In the following description of the preferred embodiments of the present invention, reference is made to the accompanying drawings that form a part hereof, and in which is shown by way of illustration specific embodiments in which the invention may be practiced. It is understood that other embodiments may be utilized and structural changes may be made without departing from the scope of the present invention.

1.0 Exemplary Operating Environment

Figure 1:
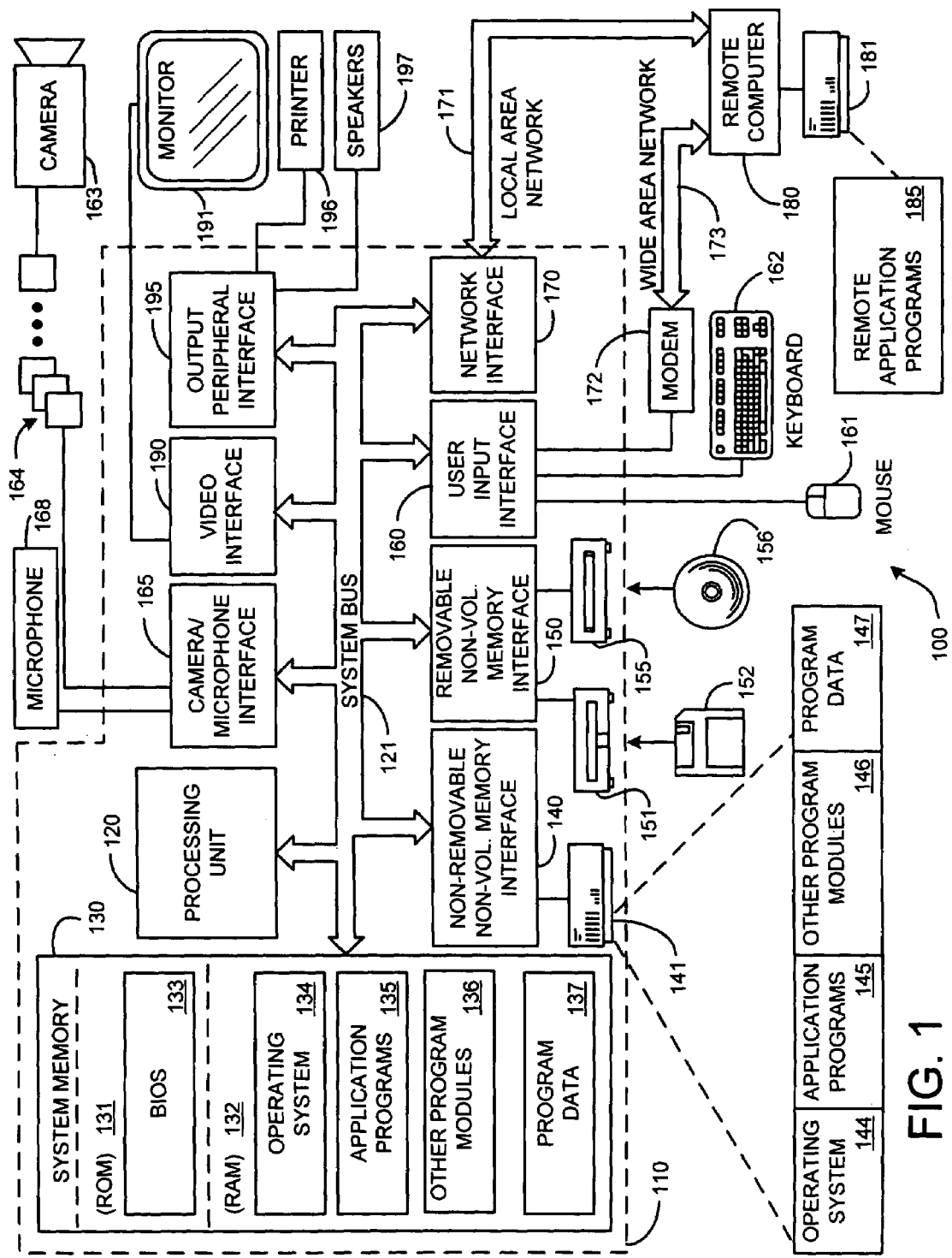
FIG. 1 is a diagram depicting a general purpose computing device constituting an exemplary system for implementing the invention.

FIG. 1 illustrates an example of a suitable computing system environment 100 on which the invention may be implemented. The computing system environment 100 is only one example of a suitable computing environment and is not intended to suggest any limitation as to the scope of use or functionality of the invention. Neither should the computing environment 100 be interpreted as having any dependency or requirement relating to any one or combination of components illustrated in the exemplary operating environment 100.

The invention is operational with numerous other general purpose or special purpose computing system environments or configurations. Examples of well known computing systems, environments, and/or configurations that may be suitable for use with the invention include, but are not limited to, personal computers, server computers, hand-held or laptop devices, multiprocessor systems, microprocessor-based systems, set top boxes, programmable consumer electronics, network PCs, minicomputers, mainframe computers, distributed computing environments that include any of the above systems or devices, and the like.

The invention may be described in the general context of computer-executable instructions, such as program modules, being executed by a computer. Generally, program modules include routines, programs, objects, components, data structures, etc. that perform particular tasks or implement particular abstract data types. The invention may also be practiced in distributed computing environments where tasks are performed by remote processing devices that are linked through a communications network. In a distributed computing environment, program modules may be located in both local and remote computer storage media including memory storage devices.

With reference to FIG. 1, an exemplary system for implementing the invention includes a general purpose computing device in the form of a computer 110. Components of computer 110 may include, but are not limited to, a processing unit 120, a system memory 130, and a system bus 121 that couples various system components including the system memory to the processing unit 120. The system bus 121 may be any of several types of bus structures including a memory bus or memory controller, a peripheral bus, and a local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnect (PCI) bus also known as Mezzanine bus.

Computer 110 typically includes a variety of computer readable media. Computer readable media can be any available media that can be accessed by computer 110 and includes both volatile and nonvolatile media, removable and non-removable media. By way of example, and not limitation, computer readable media may comprise computer storage media and communication media. Computer storage media includes both volatile and nonvolatile, removable and non-removable media implemented in any method or technology for storage of information such as computer readable instructions, data structures, program modules or other data. Computer storage media includes, but is not limited to, RAM, ROM, EEPROM, flash memory or other memory technology, CD-ROM, digital versatile disks (DVD) or other optical disk storage, magnetic cassettes, magnetic tape, magnetic disk storage or other magnetic storage devices, or any other medium which can be used to store the desired information and which can be accessed by computer 110. Communication media typically embodies computer readable instructions, data structures, program modules or other data in a modulated data signal such as a carrier wave or other transport mechanism and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, RF, infrared and other wireless media. Combinations of the any of the above should also be included within the scope of computer readable media.

The system memory 130 includes computer storage media in the form of volatile and/or nonvolatile memory such as read only memory (ROM) 131 and random access memory (RAM) 132. A basic input/output system 133 (BIOS), containing the basic routines that help to transfer information between elements within computer 110, such as during start-up, is typically stored in ROM 131. RAM 132 typically contains data and/or program modules that are immediately accessible to and/or presently being operated on by processing unit 120. By way of example, and not limitation, FIG. 1 illustrates operating system 134, application programs 135, other program modules 136, and program data 137.

The computer 110 may also include other removable/non-removable, volatile/nonvolatile computer storage media. By way of example only, FIG. 1 illustrates a hard disk drive 141 that reads from or writes to non-removable, nonvolatile magnetic media, a magnetic disk drive 151 that reads from or writes to a removable, nonvolatile magnetic disk 152, and an optical disk drive 155 that reads from or writes to a removable, nonvolatile optical disk 156 such as a CD ROM or other optical media. Other removable/non-removable, volatile/nonvolatile computer storage media that can be used in the exemplary operating environment include, but are not limited to, magnetic tape cassettes, flash memory cards, digital versatile disks, digital video tape, solid state RAM, solid state ROM, and the like. The hard disk drive 141 is typically connected to the system bus 121 through anon-removable memory interface such as interface 140, and magnetic disk drive 151 and optical disk drive 155 are typically connected to the system bus 121 by a removable memory interface, such as interface 150.

The drives and their associated computer storage media discussed above and illustrated in FIG. 1, provide storage of computer readable instructions, data structures, program modules and other data for the computer 110. In FIG. 1, for example, hard disk drive 141 is illustrated as storing operating system 144, application programs 145, other program modules 146, and program data 147. Note that these components can either be the same as or different from operating system 134, application programs 135, other program modules 136, and program data 137. Operating system 144, application programs 145, other program modules 146, and program data 147 are given different numbers here to illustrate that, at a minimum, they are different copies. A user may enter commands and information into the computer 110 through input devices such as a keyboard 162 and pointing device 161, commonly referred to as a mouse, trackball or touch pad. Other input devices (not shown) may include a microphone, joystick, game pad, satellite dish, scanner, or the like. These and other input devices are often connected to the processing unit 120 through a user input interface 160 that is coupled to the system bus 121, but may be connected by other interface and bus structures, such as a parallel port, game port or a universal serial bus (USB). A monitor 191 or other type of display device is also connected to the system bus 121 via an interface, such as a video interface 190. In addition to the monitor, computers may also include other peripheral output devices such as speakers 197 and printer 196, which may be connected through an output peripheral interface 195. Of particular significance to the present invention, a camera 163 (such as a digital/electronic still or video camera, or film/photographic scanner) capable of capturing a sequence of images 164 can also be included as an input device to the personal computer 110. Further, while just one camera is depicted, multiple cameras could be included as an input device to the personal computer 110. The images 164 from the one or more cameras are input into the computer 110 via an appropriate camera interface 165. This interface 165 is connected to the system bus 121, thereby allowing the images to be routed to and stored in the RAM 132, or one of the other data storage devices associated with the computer 110. However, it is noted that image data can be input into the computer 110 from any of the aforementioned computer-readable media as well, without requiring the use of the camera 163.

The computer 110 may operate in a networked environment using logical connections to one or more remote computers, such as a remote computer 180. The remote computer 180 may be a personal computer, a server, a router, a network PC, a peer device or other common network node, and typically includes many or all of the elements described above relative to the computer 110, although only a memory storage device 181 has been illustrated in FIG. 1. The logical connections depicted in FIG. 1 include a local area network (LAN) 171 and a wide area network (WAN) 173, but may also include other networks. Such networking environments are commonplace in offices, enterprise-wide computer networks, intranets and the Internet.

When used in a LAN networking environment, the computer 110 is connected to the LAN 171 through a network interface or adapter 170. When used in a WAN networking environment, the computer 110 typically includes a modem 172 or other means for establishing communications over the WAN 173, such as the Internet. The modem 172, which may be internal or external, may be connected to the system bus 121 via the user input interface 160, or other appropriate mechanism. In a networked environment, program modules depicted relative to the computer 110, or portions thereof, may be stored in the remote memory storage device. By way of example, and not limitation, FIG. 1 illustrates remote application programs 185 as residing on memory device 181. It will be appreciated that the network connections shown are exemplary and other means of establishing a communications link between the computers may be used.

The exemplary operating environment having now been discussed, the remaining parts of this description section will be devoted to a description of the program modules embodying the invention.

2.0 A System and Method for Encoding Mosaiced Image Data Employing a Reversible Color Transform The system and method according to the invention is described in detail in the following sections.

2.1 General Description of the Invention

The invention comprises a new color space that maps image pixel values in a mosaiced sampling pattern (such as that generated by a Bayer color filter array [1]) into four color channels that correspond to rectangular sampling patterns. Because these new channels correspond to a rectangular sampling grid, they are much more amenable to processing steps such as compression.

An additional aspect of the invention is that the transformation from the original mosaic-patterned pixels into the new four-channel color space can be made reversible in integer arithmetic. This allows for the implementation of efficient lossless image compression systems for mosaiced (e.g., raw, or raw Charged Couple Device (CCD)) images. This transform has been used in the PTC codec [7], with better compression results and lower computational complexity than systems based on pixel value prediction (such as PNG—"portable network graphics"). However, the system and method of the invention can be used for both lossless and lossy compression.

Figure 2:
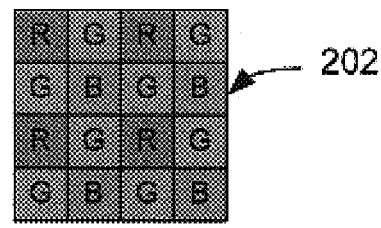
FIG. 2 is a typical Bayer mosaic for a color image captured in single-CCD digital cameras; there twice as many green (G) pixels as there are red (R) and blue (B) pixels.

FIG. 2 shows a typical pattern of pixel values 202 from a single-CCD digital camera. Different cameras may use different patterns, but almost all follow the Bayer design of twice as many green (G) pixels as red (R) and blue (B) pixels, and a diagonal adjacency (a quincunx pattern) for green pixels and for each red-blue pair.

If one wants to compress an image where the pixels are patterned as in FIG. 2, one cannot just feed the pixel values to a standard compressor designed for a single-channel (e.g. grayscale) image. The jumps in values (because adjacent pixels are not of the same colors) produce high-frequency components that significantly increase the size of the compressed data.

The present invention maps a patterned image such as the one in FIG. 2 into four images of a quarter of the size of the original. Each of the four images can be seen as an independent color channel, which is independently compressed. The four images are smooth, because their pixels correspond to a regular sampling pattern in each of the four channels. Therefore, they compressed well with any lossless image compressor.

Figure 3:
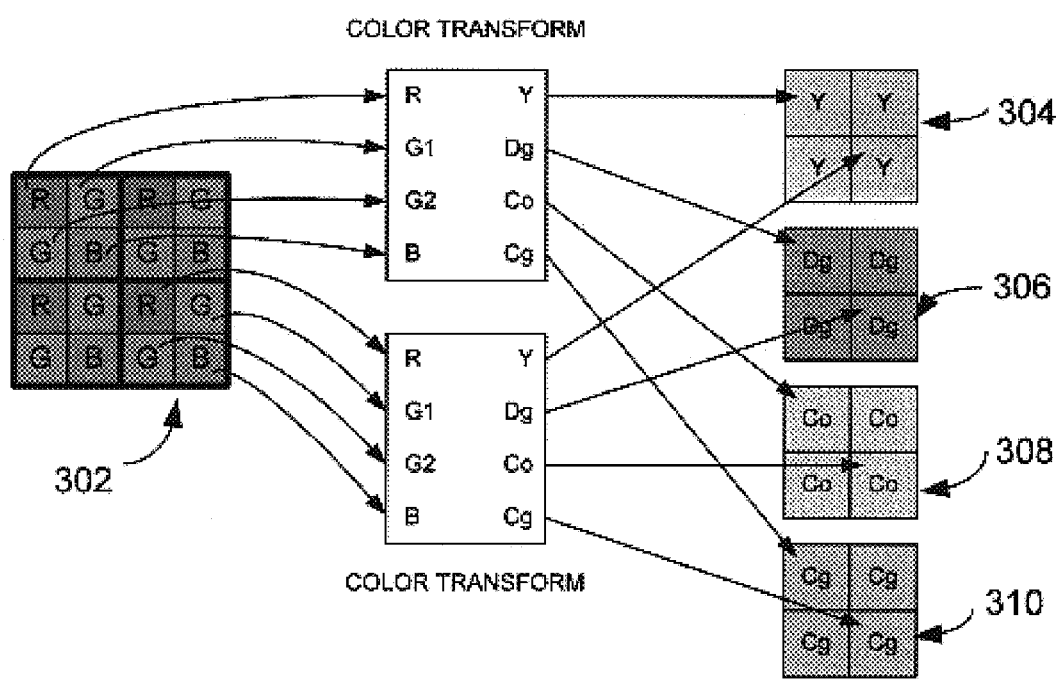
FIG. 3 depicts the mapping of a typical three-channel Bayer-mosaiced color image, such as that shown in FIG. 2, into four regular images of ¼ the original size, each for one of the channels {Y, Dg, Co, Cg}.

The invention is a method for mapping the mosaic-patterned pixels such as those in FIG. 2 to four color channels that correspond to a regular pattern. The basic idea comes for the observation that a Bayer sampling grid such as that in FIG. 2 is regular for every 2×2 block of pixels, which we call a "macropixel". So, for each 2×2 macropixel of the original mosaiced imaged, one maps its G1, G2, R, and B values into four new pixels, corresponding to four channels: Y, Dg, Co, Cg. Thus, each of these channels generates a regularly-sampled new image, as shown in FIG. 3. More specifically, the original three-channel Bayer-mosaiced image 302 is mapped into four regular images of ¼ the size of the original, each for one of the channels {Y, Dg, Co, and Cg} 304, 306, 308 and 310. If the original mosaiced image has N×N pixels, then each of the color channel images has N/2×N/2 pixels.

The mapping from a set of macropixel G1, G2, R, and B values into the four pixels values Y, Dg, Co, and Cg of the four transformed color channels is given by $$\begin{bmatrix} Y \\ Dg \\ Co \\ Cg \end{bmatrix} = \begin{bmatrix} 1/4 & 1/4 & 1/4 & 1/4 \\ -1 & 1 & 0 & 0 \\ 0 & 0 & 1 & -1 \\ 1/2 & 1/2 & -1/2 & -1/2 \end{bmatrix} \begin{bmatrix} G_1 \\ G_2 \\ R \\ B \end{bmatrix} \quad (1)$$

It is easy to see that the inverse transform is given by $$\begin{bmatrix} G_1 \\ G_2 \\ R \\ B \end{bmatrix} = \begin{bmatrix} 1 & -1/2 & 0 & 1/2 \\ 1 & 1/2 & 0 & 1/2 \\ 1 & 0 & 1/2 & -1/2 \\ 1 & 0 & -1/2 & -1/2 \end{bmatrix} \begin{bmatrix} Y \\ Dg \\ Co \\ Cg \end{bmatrix} \quad (2)$$

The YDgCoCg color space has several interesting properties:

The Y channel is just an average of all four original values in a macropixel, with a 50% green contribution and 25% contributions of R and B. Thus, Y can be seen as a luminance channel, that is, it contains the grayscale information of the image. The dynamic range of Y is the same as that of each of the original G1, G2, R, and B pixels.

Dg, Co and Cg are all color channels. If a macropixel has values G1=G2=R=B, then the macropixel is just a gray level, for which Dg=Co=Cg=0.

Dg is a "difference green" channel. The smoother the pixels values of the original image, the smaller the values of the Dg pixels, as desired.

Like in the previous YCoCg color space design [9], Cg is an "excess green" channel; as one can see in Equation (2), the original green values can be reconstructed from just the luminance Y, difference green Dg, and excess green Cg. Co is like an orange channel (although not quite), because the value is Co is largest when the input pixels have R=maximum value and B=minimum value, corresponding to a color hue between red and yellow (depending on the green values), whose mid-point is orange.

One interesting aspect of the direct and inverse transform matrices in Equations (1) and (2) is that their entries have magnitudes equal to 0, ¼, ½, or 1. That leads to a reduced computational complexity, since multiplications by those factors can be implemented by right-shift operators, if the pixel values are integer.

Usually Bayer-mosaiced (raw) images are encoded via nonlinear predictors that predict the value of a particular pixel in the raw image based on previously-encode neighboring values, taking the Bayer pattern into account. Some publications have considered the use of color space transforms to map the Bayer-mosaiced {R,G1,G2,B} data into luminance and chrominance channels [3], [4] but they use two luminance channels and two color channels, leading to a higher entropy representation than the four-channel space of the system and method according to the invention (because it has only one luminance channel). Furthermore, the transformation matrices in [3], [4] have higher complexity than those in Equations (1) and (2), because their entries are fractional numbers. Finally, the constructions in [3], [4] do not allow for exact invertibility in integer arithmetic, so they are not suitable for applications such as lossless compression.

Figure 4:
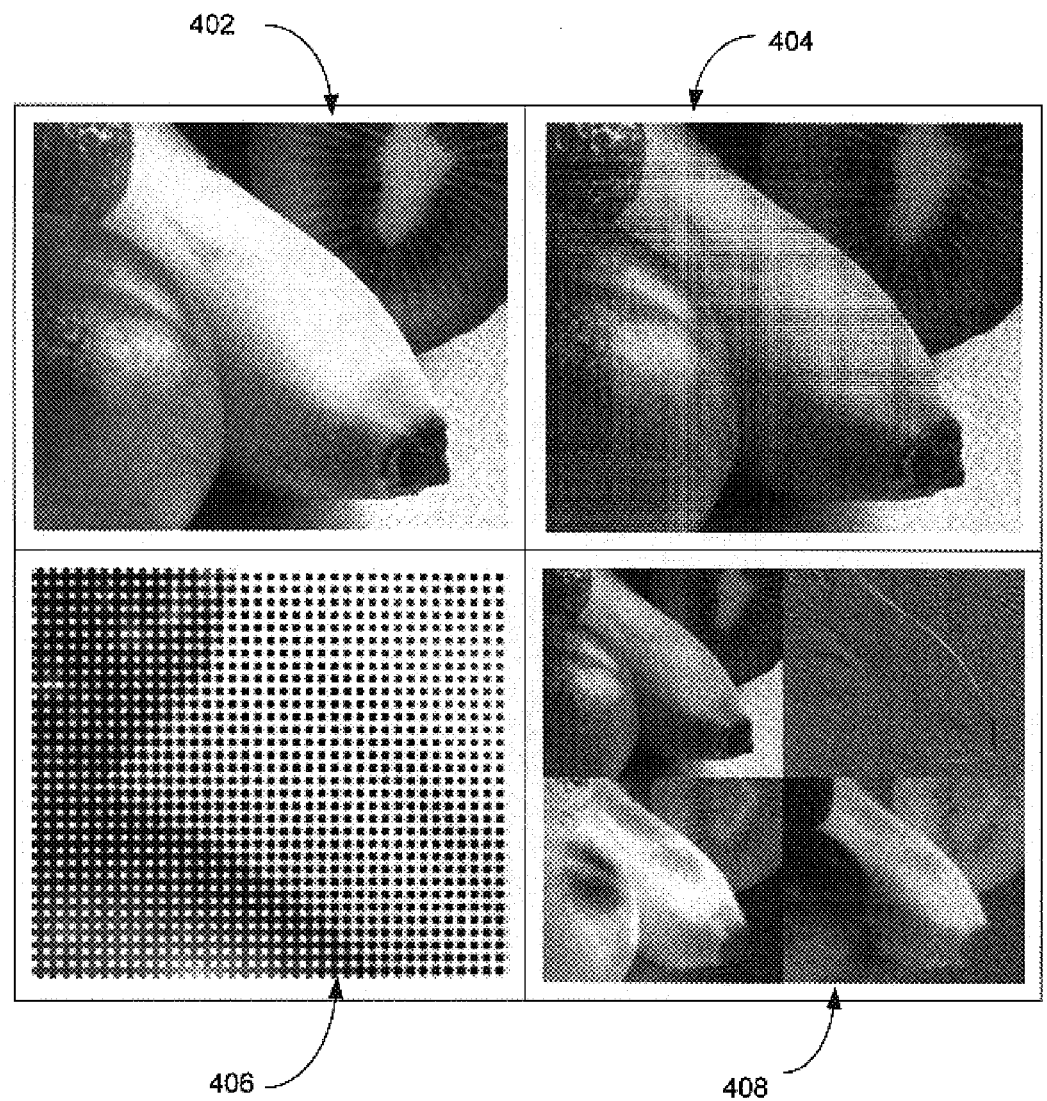
FIG. 4 is an example of the color transformation according to the system and method of the present invention. Top left: full-resolution original color image, with three colors (RGB) per pixel location. Top right: Bayer-mosaiced version of the original, according to the sampling pattern of FIG. 2; it simulates the output of a single-CCD camera. Bottom left: a zoom of the Bayer-mosaiced image, where one can clearly see the jump intensities from each of the R, G, and B locations. Bottom right: the four sub-images formed by the YDgCoCg transform of the invention (clockwise from top left: Y, Dg, Cg, Co).

FIG. 4 shows an example of using the color space transformation in the system and method according to the invention. The top left image 402 is the full-resolution original color image, with three colors (RGB) per pixel location. The top right image 404 Bayer-mosaiced version of the original, according to the sampling pattern of FIG. 2; it simulates the output of a single-CCD camera. The bottom left image 406 is a zoom of the Bayer-mosaiced image, where one can clearly see the jump intensities from each of the R, G, and B locations. The bottom right image 408 shows the four sub-images formed by the YDgCoCg transform of the invention (clockwise from top left: Y, Dg, Cg, Co). The discontinuities in pixel values in the Bayer-mosaiced image are clear, so that the image should not be fed directly to a single-channel compressor. The four sub-images generated by the four-channel color space transformation of the invention are quite smooth, and thus are amenable to compression. Furthermore, one can see that most of the information is in the Y (luminance channel). The Dg image shows just details where the gradient in green is largest, and the Co and Cg images are quite soft, because they contain only color information. Therefore, the Dg, Co, and Cg sub-images usually can each be compressed to significantly smaller sizes than that of the compressed version of the Y sub-image.

2.2 Exact Inversion in Integer Arithmetic.

One of the main applications of the new four-channel color space transformation of the invention is lossless compression of raw (Bayer-mosaiced) images. For that, one needs to be able not only to map the original {R,G1,G2,B} pixels into the transformed {Y,Dg,Co,Cg} pixels for compression, but after decompression one needs to map the decoded {Y,Dg,Co,Cg} pixels exactly back to the original {R,G1,G2,B} values.

In most cases, the original pixel G1, G2, R, and B values are integer, because the analog/digital converters used in essentially all digital cameras produce integer-valued outputs. One usually wants the transformed pixel values Y, Dg, Co, and Cg to be integer-valued, also, especially if one wants to feed them to a lossless compressor. If one uses integer arithmetic, the multiplications by factors equal to ¼ or ½ in Equations (1) and (2) lead to small truncation errors (e.g. ½×333=333>>1=166, in integer arithmetic, whereas the exact value would have been 166.5). Although small, these errors would preclude exact reconstruction of the original integer G1, G2, R, and B values from the transformed integer Y, Dg, Co, and Cg values. Thus, even though Equation (2) represents a mathematically exact inverse for real numbers, the inverse is not exact in integer arithmetic.

However, this invention also comprises a method for computing the direct and inverse transforms in Equations (1) and (2) in such a way that exact inversion under integer arithmetic is achieved. This allows for the implementation of a lossless image compression system for raw CCD (mosaiced) images, for example, by the block diagrams in FIGS. 5A and 5B.

Figure 5A:
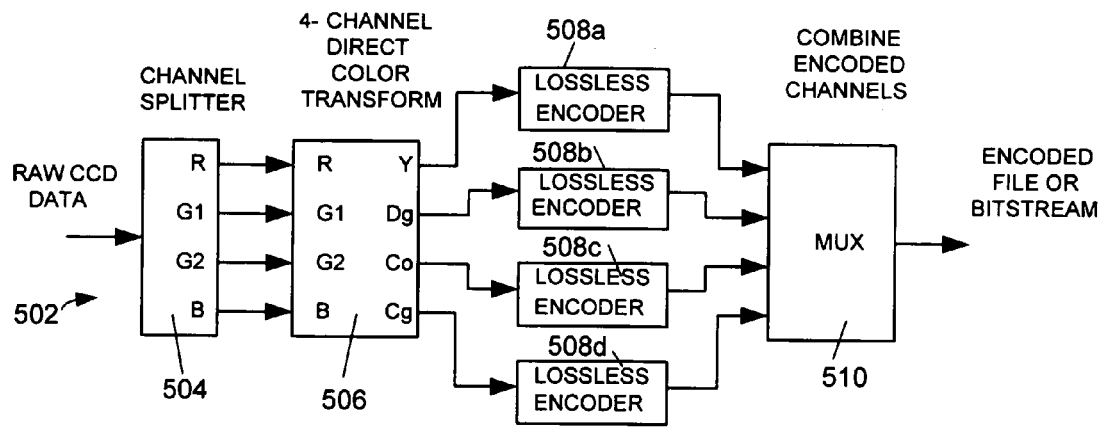
FIGS. 5A and 5B show an exemplary compression system for raw CCD images using the YDgCoCg reversible transform of the system and method of the invention.
Figure 6A:
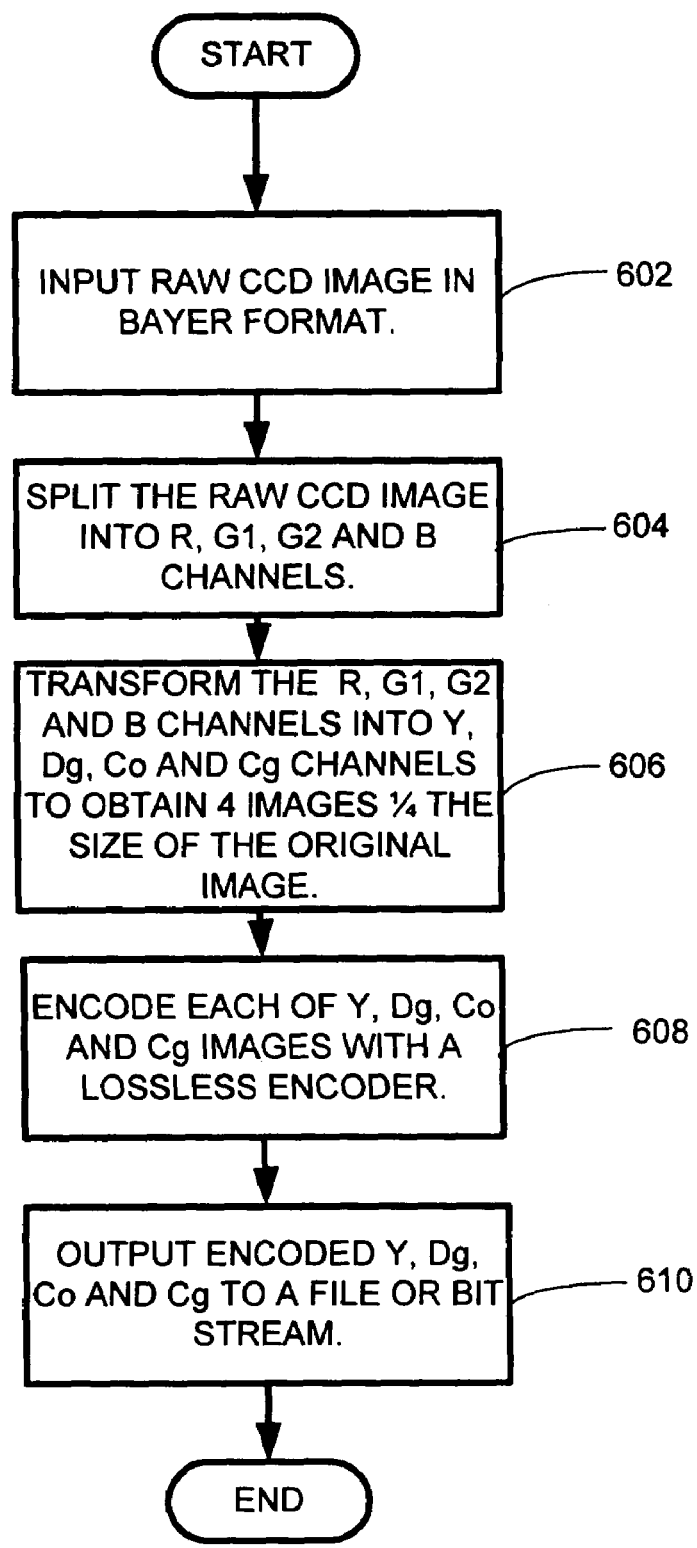
FIG. 6A depicts a flowchart of a lossless encoding process according to one embodiment of the invention.

The encoder 502 of one lossless embodiment of the invention is shown in FIG. 5A. It includes a channel splitter 504, a 4-channel direct color transform module 506, four lossless encoders, 508a, 508b, 508c, 508d and a multiplexer 510. An exemplary flowchart of the encoding process is shown in FIG. 6A. As shown in FIG. 6A, process action 602, raw CCD data is input into the channel splitter. The channel splitter splits the raw CCD data (in Bayer format) into four channels, R, G1, G2 and B on a macro-pixel basis (e.g., for every set of R, G1, G2 and B adjacent pixels in the Bayer format). Then, as shown in process action 604, the 4 channel direct color transform converts the R, G1, G2 and B channels into a Y, Dg, Co, and Cg color space or Y, Dg, Co, and Cg channels (process action 606). This results in four sub-images, each ¼ the size of the originally input data, for the Y, Dg, Co and Cg components. The four sub-images are each input into a lossless encoder (process action 608). The four encoded channels, one for each sub-image, are then combined (process action 610) to yield an encoded file or bit stream.

Figure 5B:
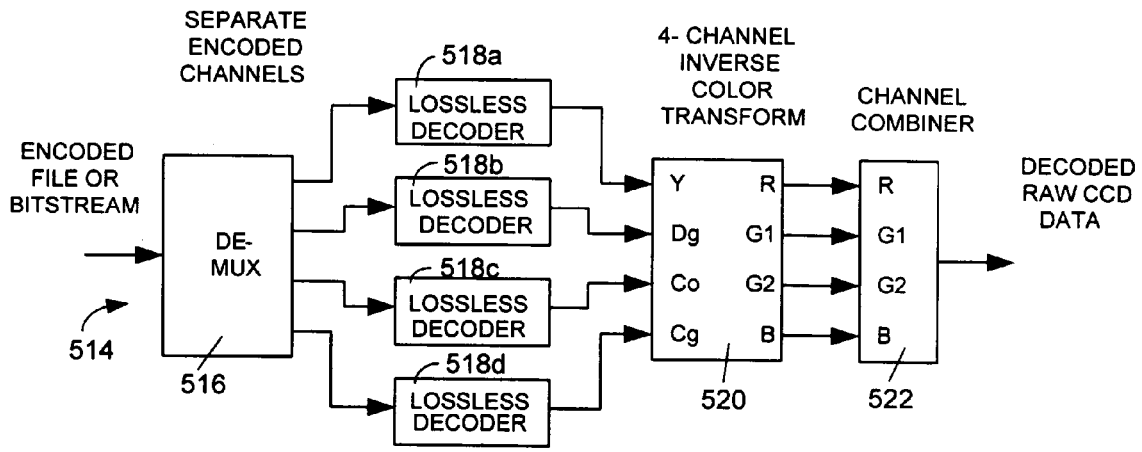
Figure 6B:
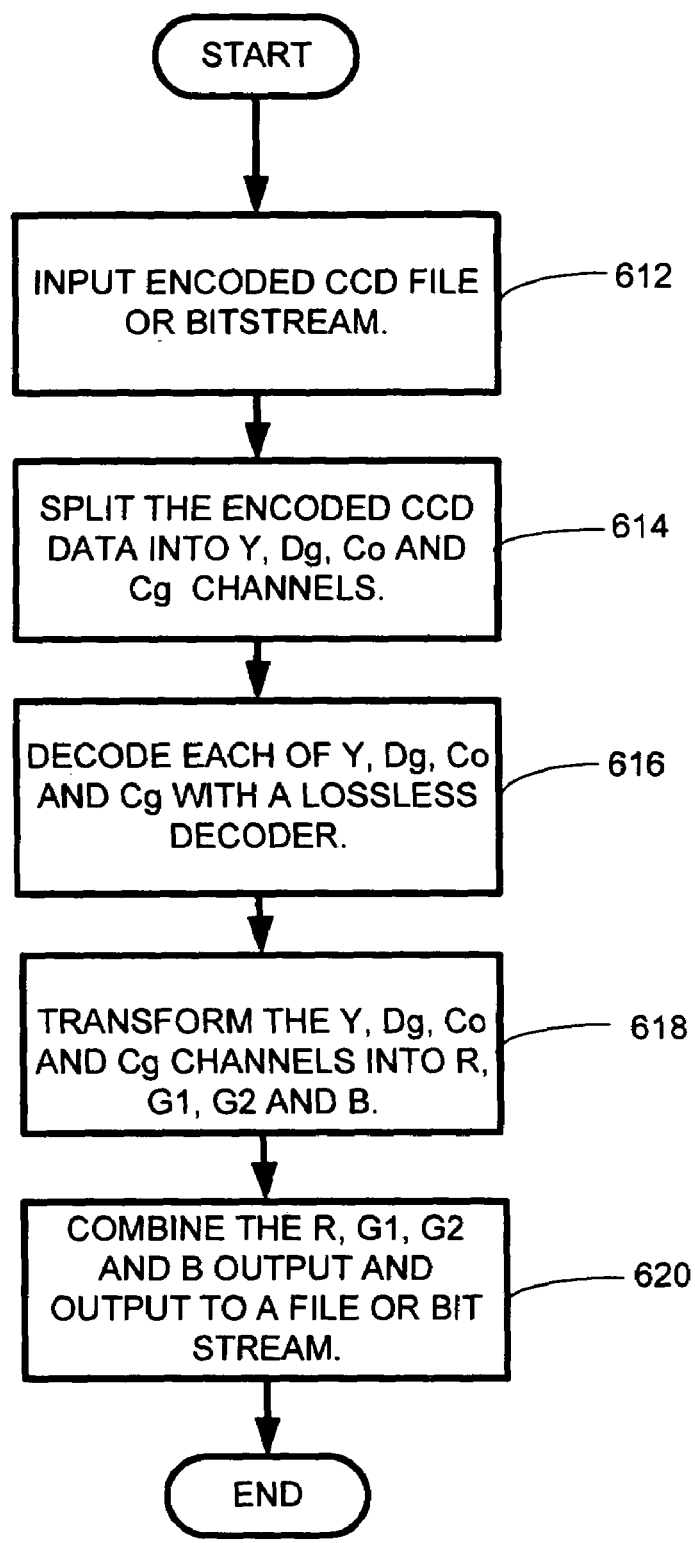
FIG. 6B depicts a flowchart of a lossless decoding process according to one embodiment of the invention.

The decoder 514 is shown in FIG. 5B. It includes a demultiplexer 516, four lossless decoders 518a, 518b, 518c, 518d, a 4-channel inverse color transform 520, and a channel combiner 522. An exemplary flowchart of the decoding process is shown in FIG. 6B. As shown in FIG. 6B, process action 612, an encoded file or bit stream is input into the demultiplexer which separates the encoded file or bit stream into separate encoded channels (process action 614). The separate encoded channels are each input into a lossless decoder which decodes each encoded channel (process action 616) into Y, Dg, Co, and Cg components. The 4-channel inverse color transform then transforms the Y, Dg, Co, and Cg components into R, G1, G2 and B channels (process action 618). A channel combiner then combines the R, G1, G2 and B channels into the decoded CCD data (in Bayer format), as shown in process action 620.

The key for an integer-reversible implementation of the direct transform/inverse transform pair in Equations (1) and (2) is a precise control of the sequence of truncation errors in the multiplications by ½ and ¼. In one implementation this construction is based on the reversible 2×2 ladder structures in [7], [9].

2.3 YDqCoCq-R Direct and Indirect Transforms:

The integer-reversible four-channel color transform of the invention is called the YDgCoCg-R transform, similarly to the YCoCg-R transform used in the PTC codec [7], [9]. Considering that all original and transformed pixel values are integer, the direct and inverse YDgCoCg-R transforms are specified by the pseudo-code below.

YDgCoCg-R Direct Transform:

$Co=R-B;$ $Dg=G2-G1;$ $u=B+(Co>>1);$ $v=G1+(Dg>>1);$ $Cg=v-u;$ $Y=u+(Cg>>1);$ (3)

YDgCoCg-R Inverse Transform:

$u=Y-(Cg>>1);$ $v=u+cg;$ $G1=v-(Dg>>1);$ $B=u-(Co>>1);$ $G2=G1+Dg;$ $R=B+Co;$ (4)

To see that the inverse transform in Equations (4) is the exact inverse of the direct transform in Equations (3), note that the inverse transform recovers the same intermediate values, and from them the original values. That is because it performs the reverse of each equation in exactly the reverse order. So, the truncation errors in the inverse transform equation are identical to those of the direct transform equation, but with reversed signs. Thus, the truncation errors cancel out.

Figure 7:
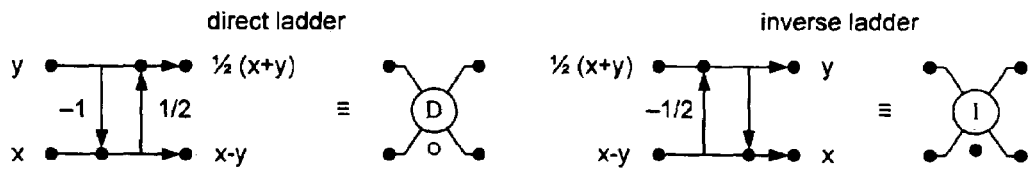
FIG. 7 is an exemplary implementation of the integer-reversible YDgCoCg-R color space transform via ladder operators according to the system and method of the invention. Top: the 2×2 basic direct and inverse ladder operators. Middle: direct YDgCoCg-R transform. Bottom: inverse transform.
Figure 7:
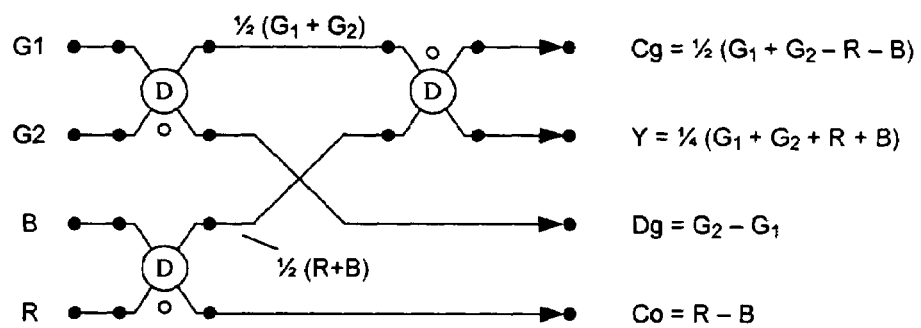
Figure 7:
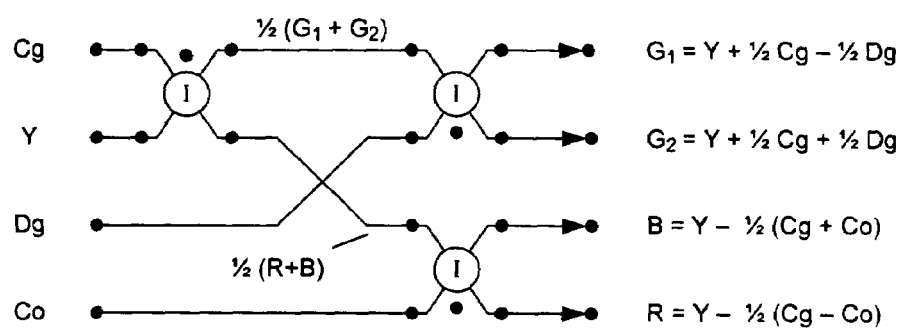

The computations in Equations (3) and (4) can be represented by the flow graphs in FIG. 7. One sees that the direct and inverse transform are computed via repeated applications of a simple 2-input, 2-ouput ladder operator, for which two inputs x and y are mapped to two outputs (x+y)/2 and x−y. That 2×2 ladder transform is called the "average/difference ladder" [10]; the average output (x+y)/2 has a small truncation error, which is canceled out by the inverse ladder. That ladder construction has been the basis of many techniques for reversible transforms, including reversible block transforms [6], [7] and reversible wavelet transforms [8].

The new reversible YDgCoCg-R color space transform is thus an extension of the previous YCoCg-R reversible transform [9]. While YCoCg-R is useful for mapping full-resolution {R,G,B} data into luminance/chrominance channels in a reversible way, YDgCoCg-R is useful for mapping Bayer-mosaiced {R,G,B} data into smooth luminance/chrominance channels, in a reversible way.

2.4 Scaled Transform.

In some applications one may not need to preserve exact invertibility in integer arithmetic, but one may still want an efficient mapping between a Bayer-mosaiced image and an equivalent four-color-channel representation. One example is lossy compression, that is, a system similar to that in FIGS. 5A and 5B, but with the encoders and decoders being lossy. Such a system could be an efficient way of performing lossy compression of images produced by a Bayer-mosaiced CCD sensor in a digital camera; it could lead to better results than the traditional approach of first applying a demosaicing (interpolation) filter and then encoding the resulting three-channel RGB image with a lossy compressor, such as JPEG.

If one does not need exact invertibility in integer arithmetic, one can simplify the direct and inverse transform matrices by just scaling rows of the direct transform and columns of the inverse transform appropriately. For example, one can scale the Co, Cg, and Dg channels by a factor of two, so that the direct transform computation becomes $$\begin{bmatrix} Y \\ Dg \\ Co \\ Cg \end{bmatrix} = \begin{bmatrix} 1/4 & 1/4 & 1/4 & 1/4 \\ -1/2 & 1/2 & 0 & 0 \\ 0 & 0 & 1/2 & -1/2 \\ 1/4 & 1/4 & -1/4 & -1/4 \end{bmatrix} \begin{bmatrix} G_1 \\ G_2 \\ R \\ B \end{bmatrix} \quad (5)$$

for which the inverse transform is given by $$\begin{bmatrix} G_1 \\ G_2 \\ R \\ B \end{bmatrix} = \begin{bmatrix} 1 & -1 & 0 & 1 \\ 1 & 1 & 0 & 1 \\ 1 & 0 & 1 & -1 \\ 1 & 0 & -1 & -1 \end{bmatrix} \begin{bmatrix} Y \\ Dg \\ Co \\ Cg \end{bmatrix} \quad (6)$$

In this form, the inverse transform is very simple: it involves only additions and subtractions; no multiplications or shifts. So, the form above is attractive in applications where decoder complexity is more important than encoder complexity.

Similarly, one could scale the matrices in such a way as to make the direct transform simpler to compute. The simplest form is $$\begin{bmatrix} Y \\ Dg \\ Co \\ Cg \end{bmatrix} = \begin{bmatrix} 1 & 1 & 1 & 1 \\ -1 & 1 & 0 & 0 \\ 0 & 0 & 1 & -1 \\ 1 & 1 & -1 & -1 \end{bmatrix} \begin{bmatrix} G_1 \\ G_2 \\ R \\ B \end{bmatrix} \quad (7)$$

for which the inverse transform is given by $$\begin{bmatrix} G_1 \\ G_2 \\ R \\ B \end{bmatrix} = \begin{bmatrix} 1/4 & -1/2 & 0 & 1/4 \\ 1/4 & 1/2 & 0 & 1/4 \\ 1/4 & 0 & 1/2 & -1/4 \\ 1/4 & 0 & -1/2 & -1/4 \end{bmatrix} \begin{bmatrix} Y \\ Dg \\ Co \\ Cg \end{bmatrix} \quad (8)$$

The original formulation in Eqns. (1) and (2) lead to balanced implementations, in the sense that the direct and inverse transforms have the same computational complexity. Plus it allows for exact reversibility in integer arithmetic (a lossless transform) as shown before. The scaled versions in Eqns. (5)-(6) and (7)-(8) allow for a simpler inverse transform or a simpler direct transform, respectively.

One should note that the scaling in Eqns. (1)-(2) is not the only one that can produce lossless transforms. Other scalings can produce lossless transforms, with appropriate modifications in the ladder networks in FIG. 7. Such variations are just trivial extension of the present invention, so that all of them do not need to be explicitly described.

Figure 8A:
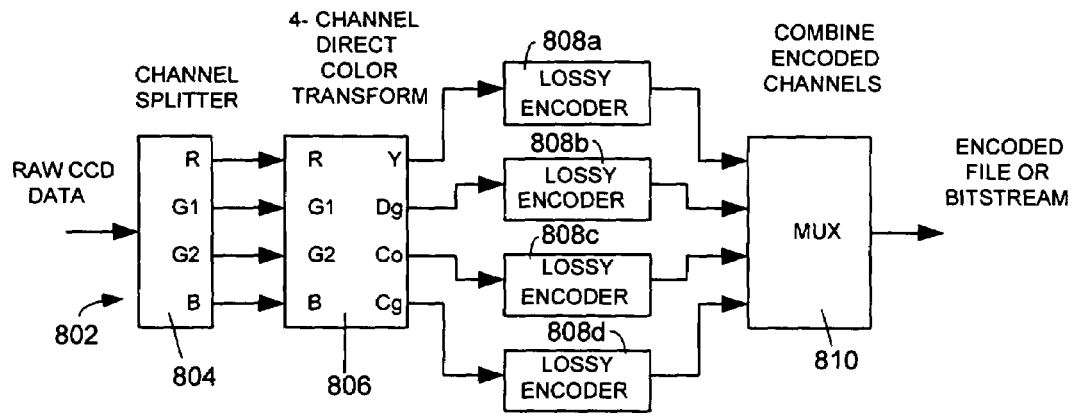
FIGS. 8A and 8B show an exemplary lossy compression system for raw CCD images using the YDgCoCg reversible transform of the system and method of the invention. Various lossy compressors can be used with the system and method according to the invention, if so desired, to obtain higher compression ratios.
Figure 8B:
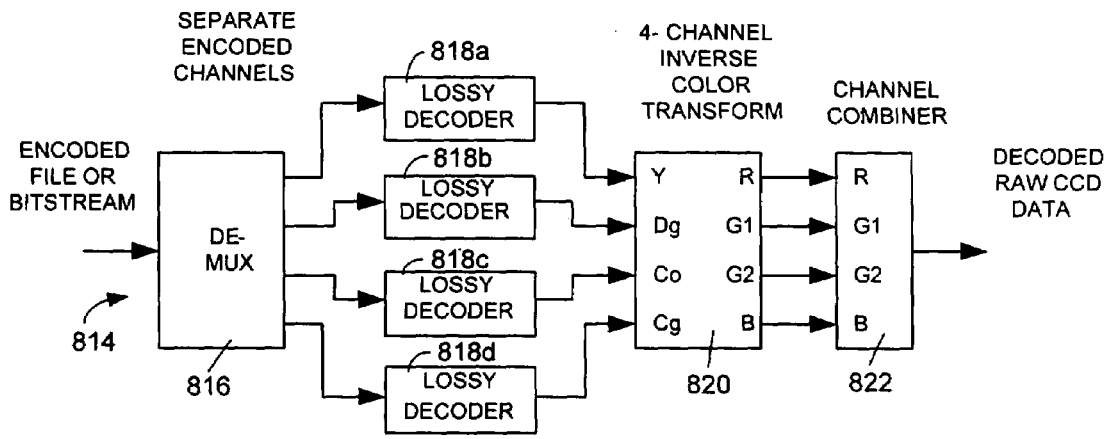

A schematic of an implementation of a lossy compression system for raw CCD (mosaiced) images is shown by the block diagrams in FIGS. 8A and 8B. For such implementations, one can use one of the scaled versions of the YDgCoCg direct and inverse transforms described above, depending on which of the encoder or decoder should have the lower complexity.

Figure 9A:
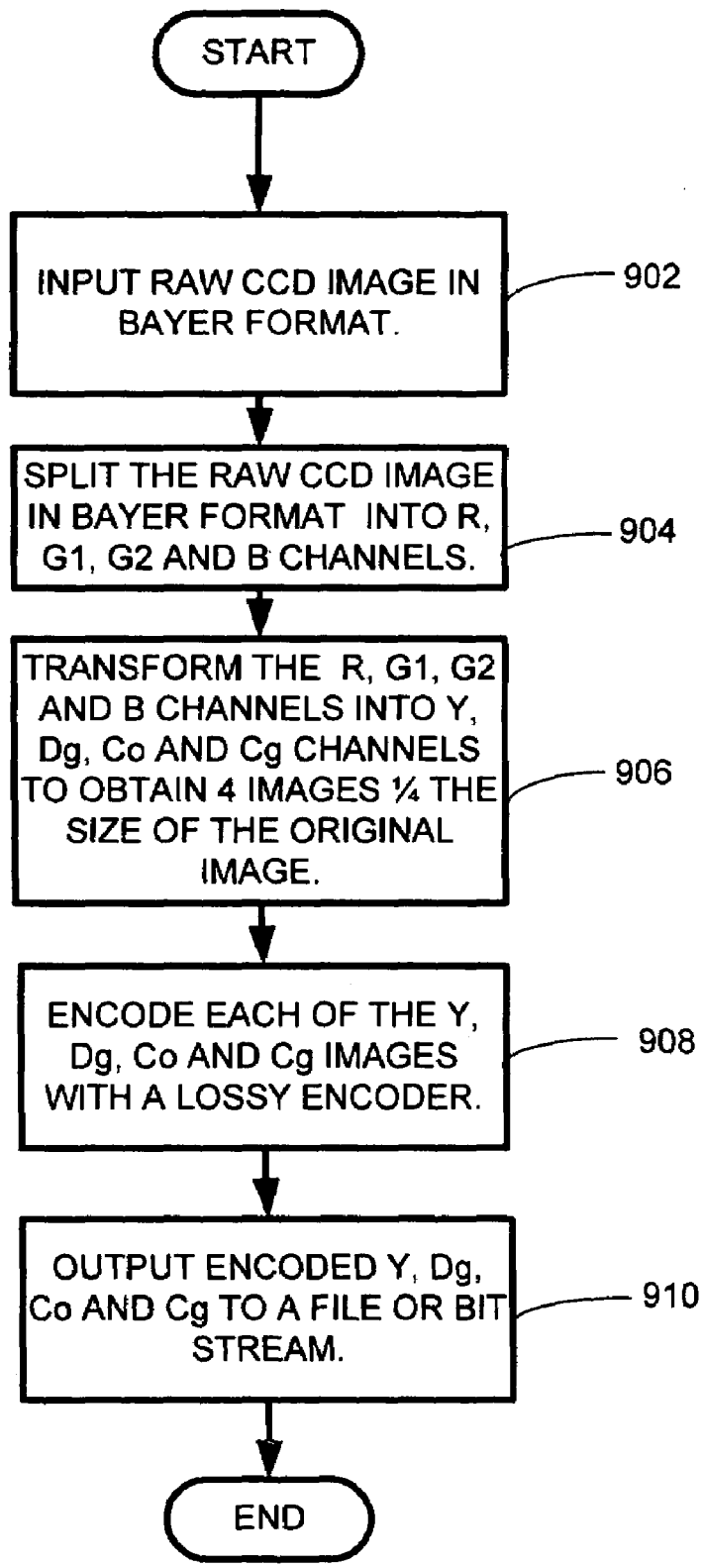
FIG. 9A is a flowchart of the lossy encoding process according to one embodiment of the invention.

The encoder 802 for a lossy compression system according to the invention is shown in FIG. 8A. It includes a channel splitter 804, a 4-channel direct color transform 806, four lossy encoders, 808a, 808b, 808c, 808d and a multiplexer 810. An exemplary flowchart is shown in FIG. 9A. As shown in FIG. 9A, process action 902, raw CCD data is input into the channel splitter. The channel splitter splits the raw CCD data (in Bayer format) into four channels, R, G1, G2 and B on a macro-pixel basis. Then, as shown in process action 904, the 4 channel direct color transform converts the R, G1, G2 and B into a Y, Dg, Co, and Cg channels (process action 906). This results in four sub-images, each ¼ the size of the originally input data, for the Y, Dg, Co and Cg components. The four sub-images are each input into a lossy encoder (process action 908). The four encoded channels, one for each sub-image, are then combined (process action 910) to yield an encoded file or bit stream.

Figure 9B:
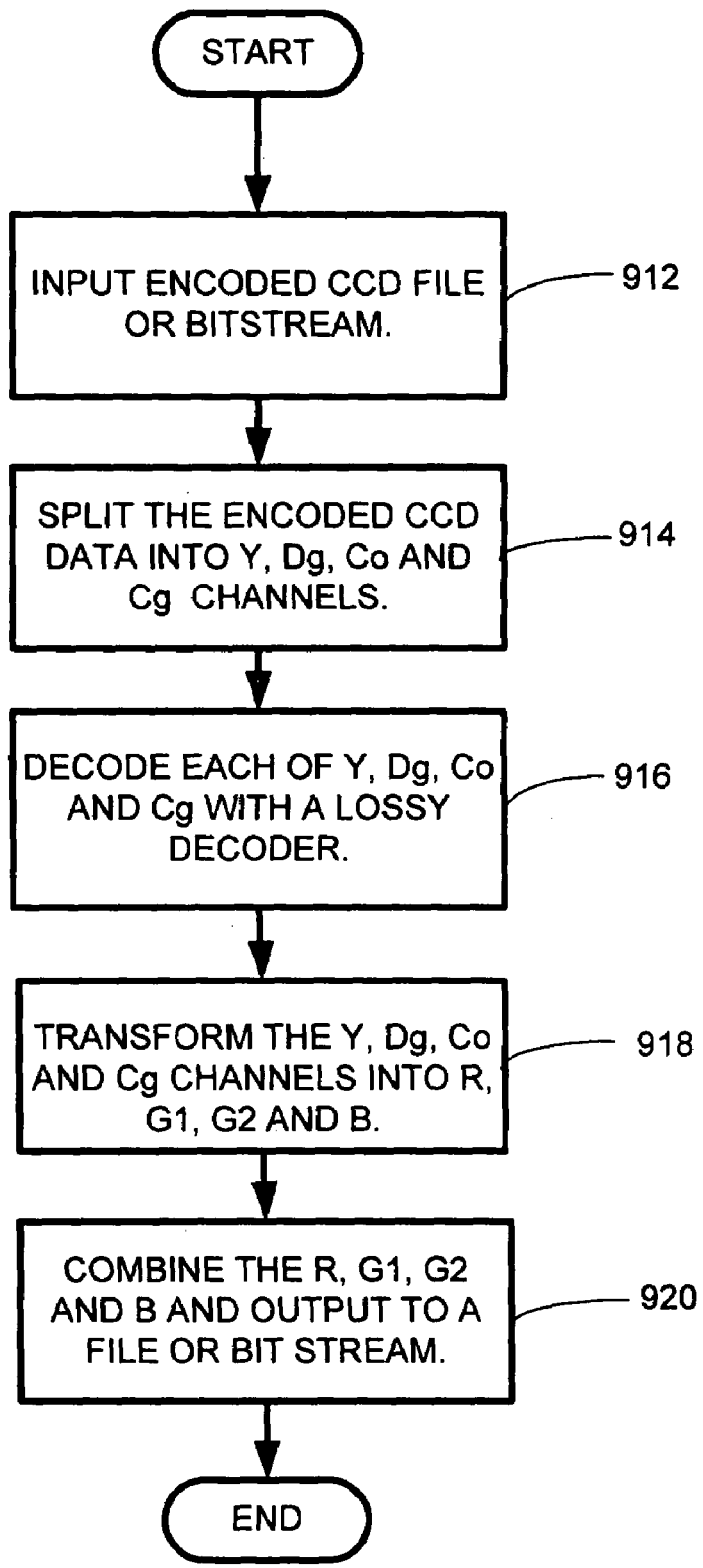
FIG. 9B is a flowchart of the lossy decoding process according to one embodiment of the invention.

The decoder 814 shown in FIG. 8B. It includes a demultiplexer 816, four lossy decoders 818a, 818b, 818c, 818d, a 4-channel inverse color transform 820, and a channel combiner 822. An exemplary flowchart is shown in FIG. 9B. As shown in FIG. 9B, process action 912, an encoded file or bit stream is input into the demultiplexer which separates the encoded file or bit stream into separate encoded channels (process action 914). The separate encoded channels are each input into a lossy decoder which decodes each encoded channel (process action 916) into Y, Dg, Co, and Cg components. The 4-channel inverse color transform then transforms the Y, Dg, Co, and Cg components into R, G1, G2 and B channels (process action 918). A channel combiner then combines the R, G1, G2 and B channels into the decoded CCD data (in Bayer format) as shown in process action 920.

The foregoing description of the invention has been presented for the purposes of illustration and description. It is not intended to be exhaustive or to limit the invention to the precise form disclosed. Many modifications and variations are possible in light of the above teaching. It is intended that the scope of the invention be limited not by this detailed description, but rather by the claims appended hereto.

REFERENCES

[1] R. Kimmel, "Demosaicing: image reconstruction from color CCD samples," *IEEE Trans. on Image Processing,* vol. 8, pp. 1221-1228, September 1999.

[2] T. Toi and M. Ohita, "A subband coding technique for image compression in single CCD cameras with Bayer color filter arrays," *IEEE Trans. Consumer Electronics,* vol. 45, pp. 176-180, February 1999.

[3] S. Y. Lee and A. Ortega, "A novel approach of image compression in digital cameras with a Bayer color filter array," *IEEE Int. Conf. Image Processing,* Thessaloniki, Greece, vol. 3, pp. 482-485, October 2001.

[4] C. C. Koh, J. Mukherjee, and S. K. Mitra, "New efficient methods of image compression in digital cameras with color filter array," *IEEE Trans. Consumer Electronics*, vol. 49, pp. 1448-1456, November 2003.

[5] P. Lux, "A novel set of closed orthogonal functions for picture coding," *Arch. Elek. Übertragung*, vol. 31, pp. 267-274, 1977.

[6] F. A. M. K. Bruekers and A. W. M. van den Enden, "New networks for perfect inversion and perfect reconstruction," *IEEE J. Selected Areas Commun.*, vol. 10, pp. 130-136, January 1992.

[7] H. S. Malvar, "A system and method for progressively transform coding digital data," U.S. Pat. No. 6,771,828 issued Aug. 3, 2004.

[8] R. C. Calderbank, I. Daubechies, W. Sweldens, and B.-L. Yeo, "Wavelet transforms that map integers to integers," *Appl. Comput. Harmon. Anal.*, vol. 5, no. 3, pp. 332-369, 1998.

[9] H. S. Malvar and G. Sullivan, "YCoCg-R: a color space with RGB reversibility and low dynamic range," Joint Video Team (JVT) of ISO/IEC MPEG & ITU-T VCEG, Doc. No. JVT-1014, Trondheim, Norway, July 2003.

[10] P. Lux, "A novel set of closed orthogonal functions for picture coding," *Arch. Elek. Übertragung*, vol. 31, pp. 267-274, 1977.

Wherefore, what is claimed is:

1. A method for encoding mosaiced image data comprising the process actions of:
    inputting raw charged couple device (CCD) image data;
    splitting the raw CCD data into red (R), a first green (G1), a second green (G2) and a blue (B) channel on a macro-pixel basis, wherein each macro-pixel comprises a set of a first green and a second green diagonally adjacent pixels and a red-blue pair of pixels R, B that is diagonally adjacent;
    transforming the red, first green, second green and blue channels into Y, Dg, Co and Cg color space channels, each representing an image one quarter the size of the original image wherein for each macro-pixel the Y channel represents luminance, Dg represents the difference between the first green pixel and the second green pixel, and the Co and Cg channels are color channels; and
    separately encoding each of the Y, Dg, Co and Cg channels with an encoder.

2. The method of claim 1 further comprising the process action of combining the Y, Dg, Co and Cg channels after encoding.

3. The method of claim 2 further comprising the process action of outputting the combined Y, Dg, Co and Cg channels to a stored file.

4. The method of claim 2 further comprising the process action of outputting the combined Y, Dg, Co and Cg channels as a bit stream.

5. The method of claim 1 wherein the red, first green, second green and blue channels are transformed into Y, Dg, Co and Cg color space channels using the transform:

$$\begin{bmatrix} Y \\ Dg \\ Co \\ Cg \end{bmatrix} = \begin{bmatrix} 1/4 & 1/4 & 1/4 & 1/4 \\ -1 & 1 & 0 & 0 \\ 0 & 0 & 1 & -1 \\ 1/2 & 1/2 & -1/2 & -1/2 \end{bmatrix} \begin{bmatrix} G_1 \\ G_2 \\ R \\ B \end{bmatrix}.$$

6. The method of claim 1 wherein the transform is computed in such a way that exact inversion under integer arithmetic is achieved.

7. The method of claim 6 wherein the transform is computed for each macro-pixel by the process actions of:
    computing Co as the red pixel minus the blue pixel;
    computing Dg as the second green pixel minus the first green pixel;
    computing a first intermediate variable u as the blue pixel plus Co;
    computing a second intermediate variable v as the first green pixel plus Dg;
    computing Cg as the second intermediate variable v minus the first intermediate variable u; and
    computing Y as the first intermediate pixel u plus Cg.

8. A method for decoding mosaiced image data comprising the process actions of:
    inputting combined Y, Dg, Do and Cg channels;
    splitting the combined channels into separate Y, Dg, Co and Cg channels;
    decoding each of the Y, Dg, Co and Cg channels with a decoder;
    transforming the Y, Dg, Co and Cg channels into red, first green, second green and blue channels; and
    combining the red, first green, second green and blue channels to output a mosaiced color image.

9. The method of claim 8 wherein the Y, Dg, Co and Cg channels are transformed by using the transform:

$$\begin{bmatrix} G_1 \\ G_2 \\ R \\ B \end{bmatrix} = \begin{bmatrix} 1 & -1/2 & 0 & 1/2 \\ 1 & 1/2 & 0 & 1/2 \\ 1 & 0 & 1/2 & -1/2 \\ 1 & 0 & -1/2 & -1/2 \end{bmatrix} \begin{bmatrix} Y \\ Dg \\ Co \\ Cg \end{bmatrix}.$$

10. The method of claim 8 wherein the transform is computed for each macro-pixel by the process actions of:
    computing a first intermediate variable u as Y minus Cg;
    computing a second intermediate variable v as the first intermediate variable u plus Cg;
    computing a first green pixel as the second intermediate variable v minus Dg;
    computing a blue pixel as the first intermediate variable u minus Co;
    computing a second green pixel as the first green pixel plus Dg; and
    computing a red pixel as the blue pixel plus Co.

11. A method for converting an image in three color space to four color space comprising:
    inputting an image in 3 color space with twice as many green (G) pixels as red (R) and blue (B) pixels, and a diagonal adjacency for green pixels and for each red-blue pair;
    dividing said image in 3 color space into macro-pixels wherein each macro-pixel comprises a set of green diagonally adjacent pixels G1, G2 and a red-blue pair of pixels R, B that is diagonally adjacent;
    for each macro-pixel, mapping the R, G1, G2 and B pixels to a four color space Y, Dg, Co and Cg to obtain four sub-images each made entirely of Y, Dg, Co and Cg pixels respectively wherein Y represents luminance, Dg represents the difference between the G1 and G2 pixels, and Co and Cg represent color;
    compressing each of the Y, Dg, Co and Cg sub-images separately; and
    combining the compressed sub-images.

12. The method of claim 11 wherein each of the sub-images are compressed with a lossless encoder.

13. The method of claim 11 wherein the R, G1, G2 and B pixels are mapped to Y, Dg, Co and Cg color space by a multiple of:

$$\begin{bmatrix} Y \\ Dg \\ Co \\ Cg \end{bmatrix} = \begin{bmatrix} 1/4 & 1/4 & 1/4 & 1/4 \\ -1 & 1 & 0 & 0 \\ 0 & 0 & 1 & -1 \\ 1/2 & 1/2 & -1/2 & -1/2 \end{bmatrix} \begin{bmatrix} G_1 \\ G_2 \\ R \\ B \end{bmatrix}.$$

14. The method of claim 11 wherein the R, G1, G2 and B pixels are mapped to Y, Dg, Co and Cg color space by:

$$\begin{bmatrix} Y \\ Dg \\ Co \\ Cg \end{bmatrix} = \begin{bmatrix} 1/4 & 1/4 & 1/4 & 1/4 \\ -1/2 & 1/2 & 0 & 0 \\ 0 & 0 & 1/2 & -1/2 \\ 1/4 & 1/4 & -1/4 & -1/4 \end{bmatrix} \begin{bmatrix} G_1 \\ G_2 \\ R \\ B \end{bmatrix}.$$

15. The method of claim 11 wherein the G1, G2, R and B pixels are mapped to Y, Dg, Co and Cg color space using the transform:

$$\begin{bmatrix} Y \\ Dg \\ Co \\ Cg \end{bmatrix} = \begin{bmatrix} 1 & 1 & 1 & 1 \\ -1 & 1 & 0 & 0 \\ 0 & 0 & 1 & -1 \\ 1 & 1 & -1 & -1 \end{bmatrix} \begin{bmatrix} G_1 \\ G_2 \\ R \\ B \end{bmatrix},$$

so as to simplify the transformation.

16. The method of claim 11 further comprising the process action of saving the combined compressed sub-images to a file.

17. The method of claim 11 further comprising the process action of outputting the combined compressed sub-images to a bit stream.

18. A computer-readable medium having computer-executable instructions for performing the method recited in claim 11.

19. A method for converting an image in four color space to three color space comprising:
 inputting an image in Y, Dg, Co, Cg color space;
 splitting the image in Y, Dg, Co and Cg color space into Y, Dg, Co and Cg channels;
 decoding each of the Y, Dg, Co and Cg channels;
 transforming the decoded Y, Dg, Co and Cg channels into R, G1, G2 and B channels; and
 combining the R, G1, G2 and B channels to obtain a color image.

20. The method of claim 19 wherein the Y, Dg, Co and Cg pixels are decoded using the transform:

$$\begin{bmatrix} G_1 \\ G_2 \\ R \\ B \end{bmatrix} = \begin{bmatrix} 1 & -1/2 & 0 & 1/2 \\ 1 & 1/2 & 0 & 1/2 \\ 1 & 0 & 1/2 & -1/2 \\ 1 & 0 & -1/2 & -1/2 \end{bmatrix} \begin{bmatrix} Y \\ Dg \\ Co \\ Cg \end{bmatrix}.$$

21. The method of claim 20 wherein the Y, Dg, Co and Cg pixels are decoded to simplify the decoding using the transform:

$$\begin{bmatrix} G_1 \\ G_2 \\ R \\ B \end{bmatrix} = \begin{bmatrix} 1 & -1 & 0 & 1 \\ 1 & 1 & 0 & 1 \\ 1 & 0 & 1 & -1 \\ 1 & 0 & -1 & -1 \end{bmatrix} \begin{bmatrix} Y \\ Dg \\ Co \\ Cg \end{bmatrix}.$$

22. The method of claim 21 wherein the Y, Dg, Co and Cg pixels are decoded using the transform:

$$\begin{bmatrix} G_1 \\ G_2 \\ R \\ B \end{bmatrix} = \begin{bmatrix} 1/4 & -1/2 & 0 & 1/4 \\ 1/4 & 1/2 & 0 & 1/4 \\ 1/4 & 0 & 1/2 & -1/4 \\ 1/4 & 0 & -1/2 & -1/4 \end{bmatrix} \begin{bmatrix} Y \\ Dg \\ Co \\ Cg \end{bmatrix}.$$

23. A method for decoding a color image encoded by the process actions of:
 inputting raw charged couple device (CCD) image data;
 splitting the raw CCD data into red (R), a first green (G1), a second green (G2) and a blue (B) channel on a macro-pixel basis, wherein each macro-pixel comprises a set of a first green and a second green diagonally adjacent pixels and a red-blue pair of pixels R, B that is diagonally adjacent;
 transforming the red, first green, second green and blue channels into Y, Dg, Co and Cg color space channels, each representing an image one quarter the size of the original image wherein for each macro-pixel the Y channel represents luminance, Dg represents the difference between the first green pixel and the second green pixel, and the Co and Cg channels are color channels; and
 separately encoding each of the Y, Dg, Co and Cg channels with an encoder; and combining the Y, Dg, Co and Cg channels, comprising the process actions of:
 inputting an image in Y, Dg, Co, Cg color space;
 splitting the image in Y, Dg, Co and Cg into Y, Dg, Co and Cg channels;
 separately decoding each of the Y, Dg, Co and Cg channels by using the inverse of the encoding used;
 transforming the decoded Y, Dg, Co and Cg channels into R, G1, G2 and B channels; and
 combining the R, G1, G2 and B channels to obtain a color image.

24. The method of claim 23 wherein the image was transformed from R, G1, G2 and B to Y, Dg, Co and Cg using the transform:

$$\begin{bmatrix} Y \\ Dg \\ Co \\ Cg \end{bmatrix} = \begin{bmatrix} 1/4 & 1/4 & 1/4 & 1/4 \\ -1 & 1 & 0 & 0 \\ 0 & 0 & 1 & -1 \\ 1/2 & 1/2 & -1/2 & -1/2 \end{bmatrix} \begin{bmatrix} G_1 \\ G_2 \\ R \\ B \end{bmatrix}; \text{ and}$$

wherein the Y, Dg, Co and Cg channels are transformed into R, G1, G2 and B channels using:

$$\begin{bmatrix} G_1 \\ G_2 \\ R \\ B \end{bmatrix} = \begin{bmatrix} 1 & -1/2 & 0 & 1/2 \\ 1 & 1/2 & 0 & 1/2 \\ 1 & 0 & 1/2 & -1/2 \\ 1 & 0 & -1/2 & -1/2 \end{bmatrix} \begin{bmatrix} Y \\ Dg \\ Co \\ Cg \end{bmatrix}.$$

25. The method of claim 23 wherein columns of a transform matrix are scaled to simplify decoding computations.

26. The method of claim 23 wherein the image was transformed from R, G1, G2 and B to Y, Dg, Co and Cg using the transform:

$$\begin{bmatrix} Y \\ Dg \\ Co \\ Cg \end{bmatrix} = \begin{bmatrix} 1/4 & 1/4 & 1/4 & 1/4 \\ -1/2 & 1/2 & 0 & 0 \\ 0 & 0 & 1/2 & -1/2 \\ 1/4 & 1/4 & -1/4 & -1/4 \end{bmatrix} \begin{bmatrix} G_1 \\ G_2 \\ R \\ B \end{bmatrix};$$

and wherein the Y, Dg, Co and Cg channels are transformed into R, G1, G2 and B channels using:

$$\begin{bmatrix} G_1 \\ G_2 \\ R \\ B \end{bmatrix} = \begin{bmatrix} 1 & -1 & 0 & 1 \\ 1 & 1 & 0 & 1 \\ 1 & 0 & 1 & -1 \\ 1 & 0 & -1 & -1 \end{bmatrix} \begin{bmatrix} Y \\ Dg \\ Co \\ Cg \end{bmatrix}.$$

27. The method of claim 23 wherein rows of a transform matrix are scaled to simplify encoding computations.

28. The method of claim 23 wherein the image is transformed from R, G1, G2 and B to Y, Dg, Co and Cg using the transform:

$$\begin{bmatrix} Y \\ Dg \\ Co \\ Cg \end{bmatrix} = \begin{bmatrix} 1 & 1 & 1 & 1 \\ -1 & 1 & 0 & 0 \\ 0 & 0 & 1 & -1 \\ 1 & 1 & -1 & -1 \end{bmatrix} \begin{bmatrix} G_1 \\ G_2 \\ R \\ B \end{bmatrix};$$

and wherein the Y, Dg, Co and Cg channels are transformed into R, G1, G2 and B channels using the transform:

$$\begin{bmatrix} G_1 \\ G_2 \\ R \\ B \end{bmatrix} = \begin{bmatrix} 1/4 & -1/2 & 0 & 1/4 \\ 1/4 & 1/2 & 0 & 1/4 \\ 1/4 & 0 & 1/2 & -1/4 \\ 1/4 & 0 & -1/2 & -1/4 \end{bmatrix} \begin{bmatrix} Y \\ Dg \\ Co \\ Cg \end{bmatrix}.$$

29. A system for encoding a raw Bayer image, the system comprising:
   inputting raw Bayer image data;
   splitting the raw Bayer image data into red (R), a first green (G1), a second green (G2) and a blue (B) channel on a macro-pixel basis, wherein each macro-pixel comprises a set of a first green and a second green diagonally adjacent pixels and a red-blue pair of pixels R, B that is diagonally adjacent;
   transforming the red, first green, second green and blue channels into Y, Dg, Co and Cg channels, each representing an image one quarter the size of the original image, wherein Y is luminance, Dg is the difference between the first green and the second green pixels and Co and Cg are color channels; and
   encoding each of Y, Dg, Co and Cg channels.

30. The system of claim 29 wherein the red, first green, second green and blue channels are transformed into Y, Dg, Co and Cg color space channels using the transform:

$$\begin{bmatrix} Y \\ Dg \\ Co \\ Cg \end{bmatrix} = \begin{bmatrix} 1/4 & 1/4 & 1/4 & 1/4 \\ -1 & 1 & 0 & 0 \\ 0 & 0 & 1 & -1 \\ 1/2 & 1/2 & -1/2 & -1/2 \end{bmatrix} \begin{bmatrix} G_1 \\ G_2 \\ R \\ B \end{bmatrix}.$$

31. The system of claim 29 wherein the R, G1, G2 and B channels are transformed into Y, Dg, Co and Cg channels by, for each macro-pixel:
   computing Co as the red pixel minus the blue pixel;
   computing Dg as the second green pixel minus the first green pixel;
   computing a first intermediate variable u as the blue pixel plus Co;
   computing a second intermediate variable v as the first green pixel plus Dg;
   computing Cg as the second intermediate variable v minus the first intermediate variable u; and
   computing Y as the first intermediate pixel u plus Cg.

32. The system of claim 31 wherein the channels are transformed using repeated applications of a two input, two output ladder operator for which two inputs x and y are mapped to two outputs (x+y)/2 and x−y.

33. A system for decoding a raw Bayer image, comprising, inputting an image in Y, Dg, Co, Cg;
   splitting the image into Y, Dg, Co and Cg channels;
   decoding each of the Y, Dg, Co and Cg channels using the reverse of the encoding process;
   transforming the decoded Y, Dg, Co and Cg channels into red, a first green, a second green and a blue channel; and
   combining the red, first green, second green and blue channel to obtain a color image.

34. The system of claim 33 wherein the transform applied to the decoded Y, Dg, Co and Cg channels comprises:

$$\begin{bmatrix} G_1 \\ G_2 \\ R \\ B \end{bmatrix} = \begin{bmatrix} 1 & -1/2 & 0 & 1/2 \\ 1 & 1/2 & 0 & 1/2 \\ 1 & 0 & 1/2 & -1/2 \\ 1 & 0 & -1/2 & -1/2 \end{bmatrix} \begin{bmatrix} Y \\ Dg \\ Co \\ Cg \end{bmatrix}.$$

35. The system of claim 33 wherein the decoded Y, Dg, Co, and Cg channels are transformed into R, G1, G2 and B channels by, for each macro-pixel:
   computing a first intermediate variable u as Y minus Cg;
   computing a second intermediate variable v as the first intermediate variable u plus Cg;
   computing a first green pixel as the second intermediate variable v minus Dg;
   computing a blue pixel as the first intermediate variable u minus Co;
   computing a second green pixel as the first green pixel plus Dg; and
   computing a red pixel as the blue pixel plus Co.

36. The system of claim 35 wherein the channels are transformed using repeated applications of a two input, two output ladder operator for which two inputs x and y are mapped to two outputs (x+y)/2 and x−y.

* * * * *